May 26, 1942.　　　　L. F. BROWN　　　　2,283,966
SLACK ADJUSTER FOR BRAKES
Filed March 24, 1941
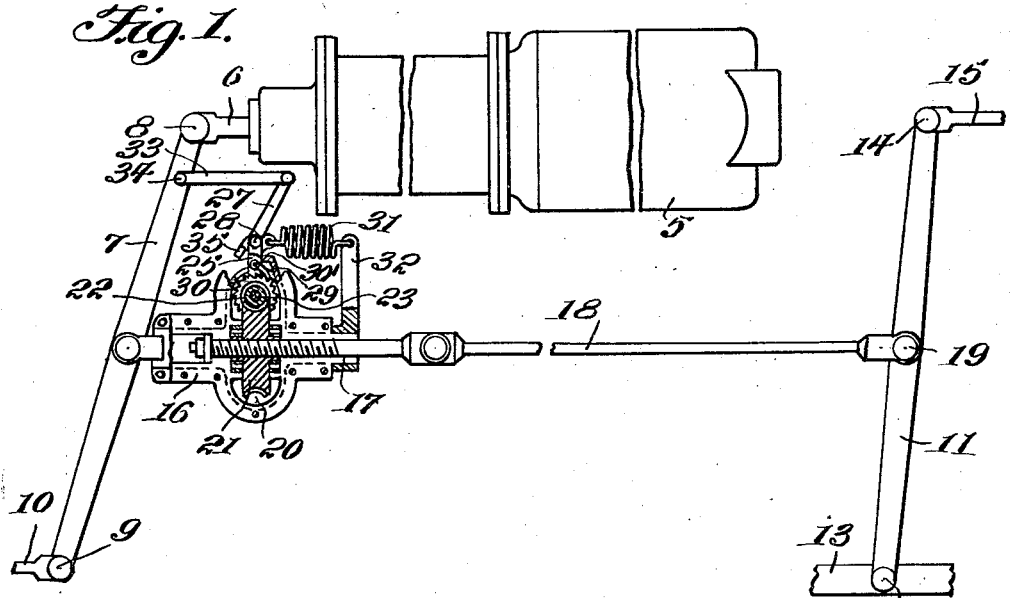
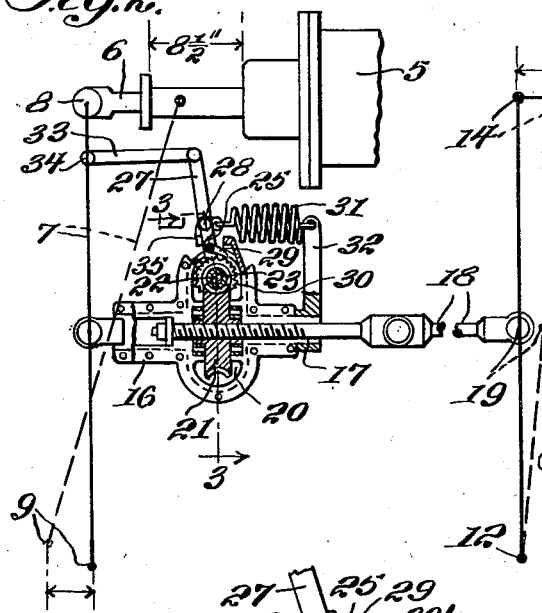
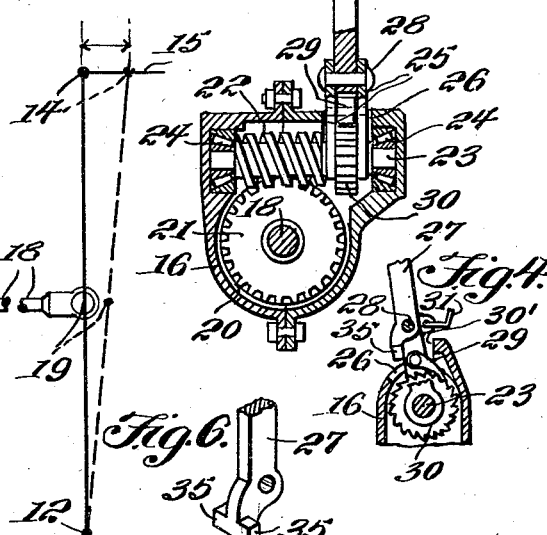
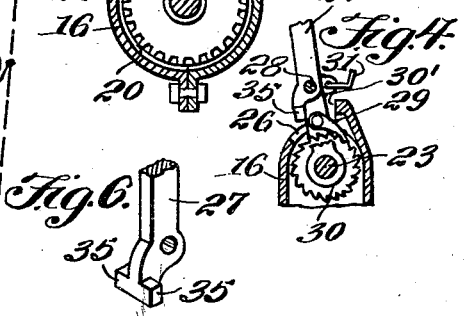
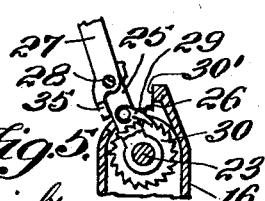
Luther F. Brown
INVENTOR
BY Victor J. Evans & Co.
ATTORNEYS
WITNESS J. L. Wright Patented May 26, 1942

2,283,966

UNITED STATES PATENT OFFICE 2,283,966

SLACK ADJUSTER FOR BRAKES

Luther F. Brown, Amarillo, Tex.

Application March 24, 1941, Serial No. 385,014

2 Claims. (Cl. 188—202)

My invention relates to slack adjusters for brakes and has as one of the principal objects thereof the provision of a slack adjuster or device so constructed and arranged as to automatically take up excessive slack, incident, for example, to wear of the brake shoes or other similar causes.

An important object of my invention is to provide a device of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views;

Figure 1 is a plan view of my invention, partly in section.

Figure 2 is a view similar to Figure 1, but illustrating the piston rod and associated parts in brake applying position.

Figure 3 is a sectional view taken on the line 3—3 of Figure 2.

Figure 4 is a detail sectional view of the upper portion of the housing and illustrating the pawl in non-operating position with respect to the ratchet wheel.

Figure 5 is a view similar to Figure 4 and illustrating the pawl in position for effecting rotation of the ratchet wheel for effecting equalization of the brakes.

Figure 6 is a detail perspective view of the lower end of the bar for operating the arms between which the pawl is pivoted.

In practising my invention, as illustrated in the drawing, I employ a brake cylinder 5, equipped with the usual piston (not shown) to which is attached a piston rod 6 extending without said cylinder and pivoted to one end of a front lever 7 as at 8. The opposite end of the lever 7 is pivotally connected, as at 9, to the rear end of a brake actuating rod 10 connected to a pair of front brake shoes (not shown) for operating the shoes into and out of engagement with a pair of front wheels (not shown).

A rear brake lever 11 is disposed rearwardly of the cylinder 5 and has one end pivotally connected, as at 12, to a frame member 13 of the vehicle. The opposite end of the lever 11 is pivotally connected, as at 14, to the front end of a rearwardly extending brake actuating rod 15, the latter being engageable with a pair of rear shoes (not shown) for operating said shoes into and out of engagement with a pair of rear wheels (not shown).

The front lever 7 is pivotally connected, between its ends, to the front of a sectional housing 16, formed with a longitudinal bore 17 in which is disposed the front threaded end of a sectional tie-rod 18, the rear end of the latter being pivotally connected with the lever 11 as at 19. The housing 16 is fashioned with a centrally disposed recess 20 in which is mounted a worm gear 21 threaded on the threaded end of said tie-rod 18. Also disposed in the recess is a worm 22 meshing with the worm gear 20, said worm being fixed to a shaft 23 having its ends disposed in bearings 24 contained in the housing and with said shaft extending at right angles with respect to the tie-rod 18.

One end of said shaft 23, adjacent the worm 22 has loosely mounted thereon a pair of spaced arms 25 extending upwardly through a slot 26 formed in said housing and with the upper end of said arms pivotally connected to the lower end of a bar 27 as at 28. The arms 25 have pivotally mounted therebetween a gravity operated pawl 29 for engagement with a ratchet wheel 30 fixed to the shaft 23 between said arms as clearly illustrated in the drawing.

Adjacent the rearwardly disposed end of the slot 26, the housing 16 is formed with an upwardly extending portion constituting a stop 30' for engagement with the arms 25. The arms 25 are connected to the front end of a coil spring 31, the rear end of which is attached to the upper end of a bracket 32. The spring serves to urge the arms toward the stop 30'. The lower end of the bracket 32 is secured to the rear end of the housing in fixed relation therewith.

The upper end of the bar 27 is pivotally connected to the rear end of a link 33, the front end of which is pivotally connected to the lever 7 adjacent its upper end as at 34. The lower end of the bar 27 extends at an appreciable distance beyond the pivot 28 and is fashioned with laterally extending lugs 35 constituting a stop for engagement with the upper ends of the arms 25 for a purpose hereinafter set forth.

It is well understood, that the stroke of the piston in the brake cylinder is limited, and should the brakes, through use, become worn excessively, the piston might travel out until it struck the head and the cylinder before the shoes would contact the wheels. For the foregoing reason, it is desirable to maintain the travel of the piston as uniform as possible, which in most cases is approximately 8½ inches. If the travel of the piston be less than the prescribed stroke, the shoes are apt to be maintained too close to the wheels, while if greater than this, a small amount of extra wear of the shoes will allow the piston to strike the head. Therefore, when the piston rod 6 is actuated outwardly, and one set of the shoes engages the wheels in advance of the other set, it causes the lugs 35 of the bar 27 to engage the arms 25 and rotate the latter a sufficient distance to ratchet the pawl 29 over the ratchet wheel 30 to effect engagement with other teeth thereon, whereby when said piston rod 6 is actuated in the opposite direction, the ratchet wheel 30 will rotate the shaft 23 and effect rotation of the gear 21 through the medium of the worm 22. When the gear 21 is rotated, it serves to advance the front end of the tie-rod 18 into the housing 16 thereby taking up the slack between the brake shoes and wheels to effect simultaneous application of all the brake shoes on their respective wheels upon operation of the brake cylinder piston to brake applying position.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. In slack adjusting mechanism for vehicle brakes, a pair of spaced brake actuating levers, operating means pivotally connected with one of the said levers, a housing pivotally connected with the intermediate portion of one of the levers, a tie rod pivotally connected to the intermediate portion of the complementary lever having a threaded end portion telescopically engaging the said housing, a worm gear rotatably mounted in the housing having an interiorly threaded bore engaging the threaded portion of the tie rod, a worm journalled in the housing and meshing with the worm gear, the said worm having a shaft extension, a ratchet wheel fixed on the shaft extension of the worm, a pair of arms pivotally connected to the said shaft extension and extending radially therefrom at each side of the ratchet wheel, a pawl pivotally mounted between the said arms in engagement with the ratchet wheel, a spring connected to the said arms for yieldingly holding the pawl in a predetermined position, a link pivotally connected to one of the said brake levers, and a bar pivotally connected to the outer end of the link and having knee joint connection with the said radial arms operative to move the pawl only upon excessive movement of the said brake lever for slack takeup of the tie rod through the action of the spring and gear mechanism.

2. In a device of the character described, a piston actuated brake lever, a second lever spaced from the piston actuated lever, a housing pivotally connected to the said piston actuated lever, a tie rod pivotally connected to the second lever having the outer portion exteriorly screw threaded and slidably associated with the said housing, a worm gear rotatably mounted in the housing having an interiorly threaded bore engaging the threaded portion of the tie rod for longitudinal movement of the latter, a worm journalled in the housing and in mesh with the said worm gear, the said worm having a shaft extension, a ratchet wheel fixed transversely on the shaft extension of the worm, a pair of arms pivotally connected with the shaft extension and extending radially therefrom at each side of the ratchet wheel, the said housing having a stop projection for limiting the movement of the said arms in one direction, a pawl pivotally connected to the said arms engaging the ratchet wheel, a tension spring having connection with the housing and with the said arms yieldingly holding the arms against the stop projection, a link pivotally connected to the piston actuated brake lever, a bar connected to the said link and pivotally connected to the pawl carrying arms, and an extension at the inner end of the bar engageable with the said arm and forming a knee joint thereat, whereby upon overtravel of the piston actuated lever the said bar will move the arms and the pawl with relation to the ratchet wheel so that upon release of the lever the spring will swing the arms at the pawl to actuate the worm gearing to effect slack adjustment of the tie rod.

LUTHER F. BROWN.